(12) United States Patent
DeLuca et al.

(10) Patent No.: US 11,645,689 B2
(45) Date of Patent: May 9, 2023

(54) MARKETPLACE CONTENT PROVIDER INCLUSION NOTIFICATION

(71) Applicant: International Business Machines Corporation, Armonk, NY (US)

(72) Inventors: Lisa Seacat DeLuca, Baltimore, MD (US); Chandler Maskal, Melrose, MA (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 17/029,132

(22) Filed: Sep. 23, 2020

(65) Prior Publication Data

US 2022/0092655 A1   Mar. 24, 2022

(51) Int. Cl.
```
G06Q 30/0601    (2023.01)
G06F 16/9536    (2019.01)
G06Q 30/0251    (2023.01)
G06Q 20/12      (2012.01)
```

(52) U.S. Cl.
CPC ..... *G06Q 30/0605* (2013.01); *G06F 16/9536* (2019.01); *G06Q 30/0254* (2013.01); *G06Q 30/0611* (2013.01); *G06Q 30/0617* (2013.01); *G06Q 20/123* (2013.01)

(58) Field of Classification Search
None
See application file for complete search history.

(56) References Cited

U.S. PATENT DOCUMENTS

| | | | |
|---|---|---|---|
| 6,721,748 | B1 | 4/2004 | Knight et al. |
| 10,475,098 | B2* | 11/2019 | Koch ................. G06Q 30/0625 |
| 2002/0107812 | A1 | 8/2002 | Schimitzek |
| 2003/0028469 | A1 | 2/2003 | Bergman et al. |
| 2005/0216364 | A1 | 9/2005 | Jurisic et al. |
| 2006/0190350 | A1* | 8/2006 | Maas .................... G06Q 30/00 705/26.8 |
| 2008/0046330 | A1 | 2/2008 | Daoud et al. |
| 2012/0030018 | A1* | 2/2012 | Passmore ............... G06Q 30/02 707/754 |
| 2019/0095949 | A1 | 3/2019 | Chien et al. |
| 2019/0114663 | A1 | 4/2019 | Goldman et al. |
| 2020/0013074 | A1 | 1/2020 | Yokota |
| 2021/0366586 | A1* | 11/2021 | Ryan ..................... G06Q 20/20 |

OTHER PUBLICATIONS

"IBM Digital Twin Exchange", Overview IBM, Printed Jun. 28, 2020, 5 pages, <https://www.ibm.com/products/digital-twin-exchange>.
"WooCommerce Product Search", WooCommerce Docs, Printed Jun. 28, 2020, 4 pages, <https://docs..woocommerce.com/document/woocommerce-product-search/>.

* cited by examiner

*Primary Examiner* — Giuseppi Giuliani
(74) *Attorney, Agent, or Firm* — Michael O'Keefe

(57) ABSTRACT

In an approach to providing a notification based on lack of search results, one or more computer processors monitor one or more queries for content in an online marketplace. One or more computer processors determine that a result of the one or more queries is content is not found. One or more computer processors determine that a history of the result of the one or more queries for the content exceeds a threshold for content not found. One or more computer processors send a notification of the history.

14 Claims, 4 Drawing Sheets

MARKETPLACE CONTENT PROVIDER INCLUSION NOTIFICATION

BACKGROUND OF THE INVENTION

The present invention relates generally to the field of search engines, and more particularly to providing a notification based on lack of search results.

Online marketplaces are information technology platforms that act as intermediaries by connecting sellers and consumers. On the website of the online marketplace, sellers can publish their product offering with a price and information on the product's features and qualities. Potential customers can search and browse goods, compare price and quality, and then purchase the goods directly from the seller. The inventory is held by the sellers, not the company running the online marketplace. Online marketplaces are characterized by a low setup cost for sellers, because they do not have to run a retail store, although the sellers may have to pay to subscribe to the online marketplace service. For consumers, online marketplaces reduce the search cost and provide a wide variety of products to choose from.

An example of an online marketplace is a digital twin marketplace. A digital twin refers to a digital representation of a physical asset. In Internet of Things (IoT) systems, a digital twin can represent an evolving virtual data model that mimics the physical asset as well as the experiences and state changes of the physical asset. A digital twin may be said to store and track information about its twin physical asset. A digital twin marketplace allows manufacturers and suppliers to share digital resources associated with physical assets with owners and operators of the manufacturers' physical assets. Examples of digital resources include, but are not limited to, a bill of materials, warranty bulletins, warranty claims, maintenance plans, maintenance history, part replacement history, part usage history, specifications, 3-dimensional model and drawing data, operating manuals, usage data, operating history, ownership history, applicable standards, etc.

SUMMARY

Embodiments of the present invention disclose a method, a computer program product, and a system for providing a notification based on lack of search results. The method may include one or more computer processors monitoring one or more queries for content in an online marketplace. One or more computer processors determine that a result of the one or more queries is content is not found. One or more computer processors determine that a history of the result of the one or more queries for the content exceeds a threshold for content not found. One or more computer processors send a notification of the history.

DETAILED DESCRIPTION

A problem faced by online marketplaces, especially at start-up, is the development of content. The content needs to be the right content to satisfy the business and operations needs of the owners and operators of the products sold in the online marketplace, where content can include both physical and digital resources. Embodiments of the present invention recognize that efficiency in curating and providing content can be improved by systematically alerting manufacturers and suppliers, as well as online marketplace administrators, when end users are unable to find desired content in the online marketplace. Embodiments of the present invention also recognize that participation in the online marketplace can be improved if the alert includes evidence-based incentives to back up a request for participation. Implementation of embodiments of the invention may take a variety of forms, and exemplary implementation details are discussed subsequently with reference to the Figures.

Figure 1:
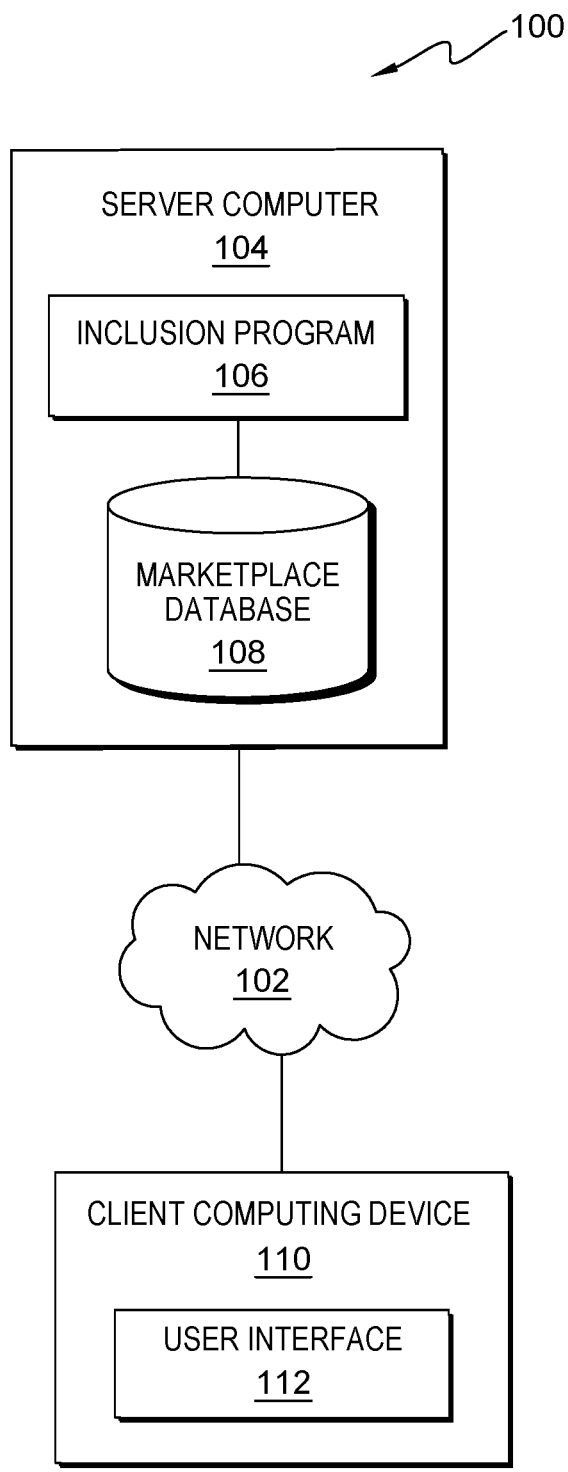
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 110, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 110, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 110 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes inclusion program 106 and marketplace database 108. Server computer 104 may include internal and external hardware components, as depicted and described in further detail with respect to FIG. 4.

Inclusion program 106 systematically alerts content manufacturers and suppliers, as well as marketplace administrators, when end users desire content but are unable to find the content within the marketplace. As referred to herein, the term "supplier" can be used interchangeably with a manufacturer, a vendor, a content owner, and a third-party content provider. The notification can include evidence to back up a request to participate in the marketplace. Inclusion program 106 monitors queries for marketplace content. Inclusion program 106 determines that the content is not found in marketplace database 108. Inclusion program 106 maps the query to the content owner. Inclusion program 106 determines whether a history of queries for the content exceeds a threshold. If inclusion program 106 determines the history of queries exceeds the threshold, then inclusion program 106 aggregates the search history information. Inclusion program 106 generates a report with the aggregated information. Inclusion program 106 sends a notification. Inclusion program 106 is depicted and described in further detail with respect to FIG. 2.

Marketplace database 108 is a repository for data used by inclusion program 106. Marketplace database 108 can represent one or more databases. In the depicted embodiment marketplace database 108 resides on server computer 104. In another embodiment, marketplace database 108 may reside elsewhere within distributed data processing environment 100, provided inclusion program 106 has access to marketplace database 108. A database is an organized collection of data. Marketplace database 108 can be implemented with any type of storage device capable of storing data and configuration files that can be accessed and utilized by inclusion program 106, such as a database server, a hard disk drive, or a flash memory. Marketplace database 108 stores a corpus of content associated with physical and/or digital resources provided by one or more manufacturers and/or suppliers which plan to sell the content in the marketplace. For example, if the marketplace is a digital twin marketplace, then marketplace database 108 stores digital content associated with a physical asset, such as a bill of materials or an operating manual. Marketplace database 108 also stores product or content search histories. Marketplace database 108 may also store contact information for users and for content manufacturers and suppliers. Marketplace users may create an account with the marketplace and marketplace database 108 stores user account and/or profile information. Marketplace database 108 may also store contact information for content owners not currently participating in the online marketplace which may be used for notification purposes. Marketplace database 108 may also store contact information for marketplace administrators. For example, contact information may include, but is not limited to, a phone number, an email address, a business address, etc.

The present invention may contain various accessible data sources, such as marketplace database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Inclusion program 106 enables the authorized and secure processing of personal data. Inclusion program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Inclusion program 106 provides information regarding personal data and the nature (e.g., type, scope, purpose, duration, etc.) of the processing. Inclusion program 106 provides the user with copies of stored personal data. Inclusion program 106 allows the correction or completion of incorrect or incomplete personal data. Inclusion program 106 allows the immediate deletion of personal data.

Client computing device 110 can be one or more of a laptop computer, a tablet computer, a smart phone, smart watch, a smart speaker, or any programmable electronic device capable of communicating with various components and devices within distributed data processing environment 100, via network 102. Client computing device 110 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 110 may be integrated into a vehicle of the user. For example, client computing device 110 may include a heads-up display in the windshield of the vehicle. In general, client computing device 110 represents one or more programmable electronic devices or combination of programmable electronic devices capable of executing machine readable program instructions and communicating with other computing devices (not shown) within distributed data processing environment 100 via a network, such as network 102. Client computing device 110 includes an instance of user interface 112.

User interface 112 provides an interface between inclusion program 106 on server computer 104 and a user of client computing device 110. In one embodiment, user interface 112 is mobile application software. Mobile application software, or an "app," is a computer program designed to run on smart phones, tablet computers and other mobile devices. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program.

User interface 112 enables a user of client computing device 110 to input a search query for content stored in marketplace database 108 and receive search results. In an embodiment where the user of client computing device 110 is a content owner not currently participating in the online marketplace, user interface 112 enables the user to communicate with inclusion program 106 or with a marketplace administrator. User interface 112 may also enable a user to create an account with the marketplace and input account and/or profile information.

Figure 2:
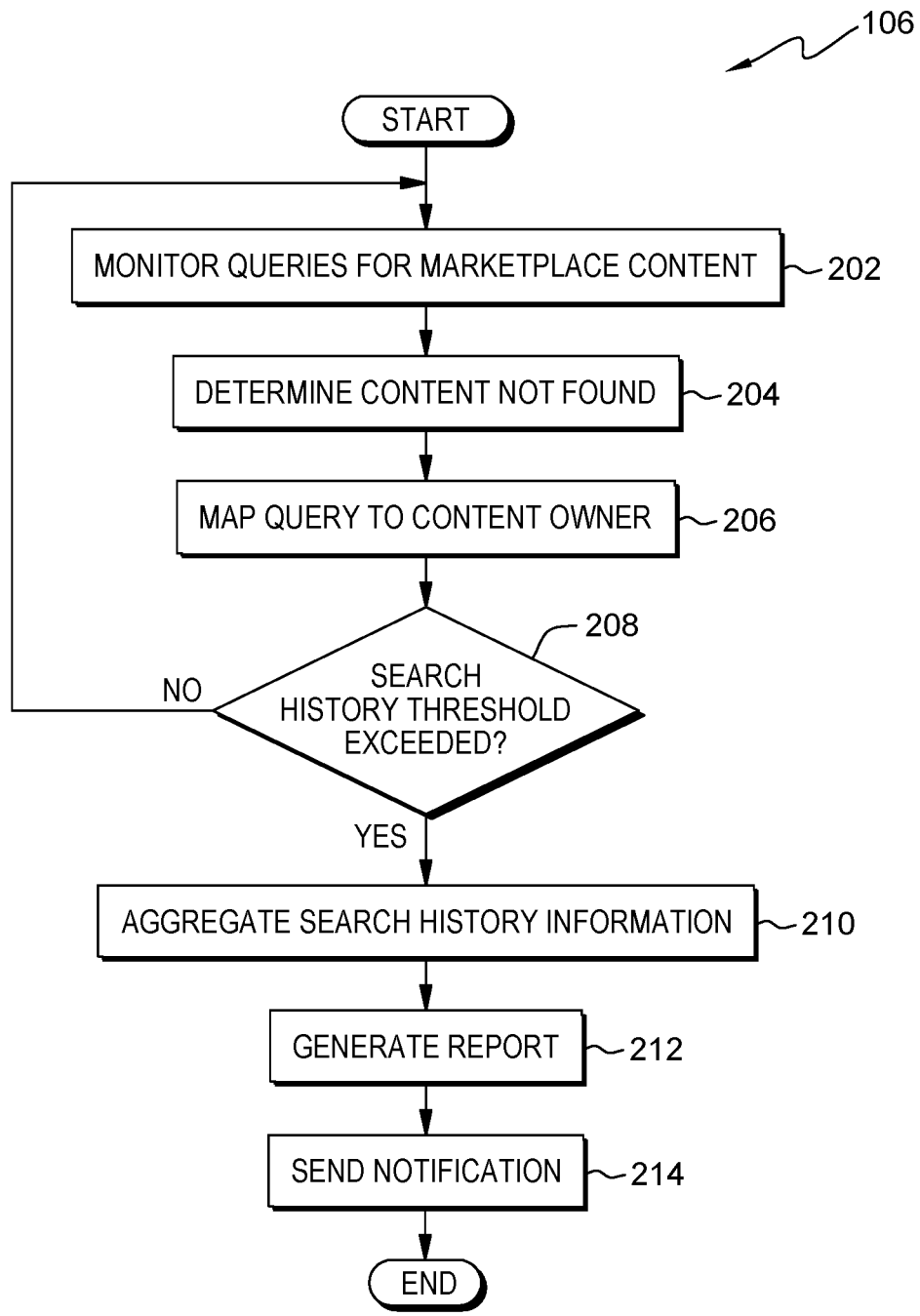
FIG. 2 is a flowchart depicting operational steps of an inclusion program, on a server computer within the distributed data processing environment of FIG. 1, for providing a notification based on lack of search results, in accordance with an embodiment of the present invention.

FIG. 2 is a flowchart depicting operational steps of inclusion program 106, on server computer 104 within distributed data processing environment 100 of FIG. 1, for providing a notification based on lack of search results, in accordance with an embodiment of the present invention.

Inclusion program 106 monitors queries for marketplace content (step 202). In an embodiment, inclusion program 106 continuously monitors and tracks queries input, via user interface 112, by users of marketplace content stored in marketplace database 108. For example, inclusion program 106 may monitor searches for particular part numbers or model numbers belonging to a manufacturer. While monitoring queries, inclusion program 106 creates a search history associated with the queries and stores the search history in marketplace database 108. Inclusion program 106 may organize the search history, for example, by user, i.e., the searcher, and/or by search terms, such as brand name.

Inclusion program 106 determines content is not found (step 204). In an embodiment, inclusion program 106 determines that content is not found when the query does not return a result, i.e., the result count is zero. In another embodiment, inclusion program 106 determines that content is not found by determining that no results were selected after the results were displayed via user interface 112. In a further embodiment, inclusion program 106 determines that content is not found by determining that a new query is input after the results are displayed via user interface 112.

Inclusion program 106 maps the query to the content owner (step 206). In an embodiment, inclusion program 106 maps the query to the owner of the content, whether that is a manufacturer, a supplier, or a third-party provider, thereby matching the content owner to the content. For example, inclusion program 106 may map the query based on specific keywords, such as model numbers. In another example, inclusion program 106 may map the query based on a brand name or company name. In one embodiment, the supplier may define the mapping. In another embodiment, a marketplace administrator may define the mapping, such as when the content owner is not a participant in the marketplace. In a further embodiment, users within an organization that search for digital resources may define the mapping. In yet another embodiment, the mapping may be defined using a combination of the supplier, the marketplace administrator, and the users.

Inclusion program 106 determines whether a search history exceeds a threshold (decision block 208). In an embodiment, inclusion program 106 reviews a search history associated with the current query to determine whether the current query causes the search history to exceed a threshold. For example, the threshold may be a specific quantity of queries that do not result in desired content, such as greater than 150 queries. In another example, the threshold may be a specific quantity of unique users performing the search, such as greater than 50 users. In an embodiment, inclusion program 106 may reset thresholds periodically. For example, inclusion program 106 may reset thresholds weekly, monthly, quarterly, annually. In an embodiment, inclusion program 106 may receive a threshold reset schedule from a marketplace administrator. In an embodiment, the marketplace administrator sets the threshold. In another embodiment, the supplier that defined the mapping, as discussed with respect to step 206, may set the threshold. In a further embodiment, users within an organization that searches for digital resources that defined the mapping, as discussed with respect to step 206, may set the threshold. In an embodiment, inclusion program 106 may use a combination of threshold types to determine if the search history threshold is exceeded. For example, inclusion program 106 may determine if the quantity of queries exceeds a threshold in addition to, or instead of, the quantity of unique searchers exceeding a threshold.

If inclusion program 106 determines the search history does not exceed a threshold ("no" branch, decision block 208), then inclusion program 106 returns to step 202 to continue monitoring search queries for the content.

If inclusion program 106 determines the search history does exceed a threshold ("yes" branch, decision block 208), then inclusion program 106 aggregates the search history information (step 210). In an embodiment, responsive to inclusion program 106 determining the search history exceeds a threshold, inclusion program 106 aggregates the corresponding search history data stored in marketplace database 108. The aggregated data may include, but is not limited to, search query keywords or search terms, the corresponding content owner name, dates the searches were performed, desired content that was not found, etc.

Inclusion program 106 generates a report (step 212). In an embodiment, based on the aggregated search history data, inclusion program 106 generates a report. In an embodiment, the report includes evidence for convincing a content owner to participate in the online marketplace. For example, the report may include information about the search and desired content that was not found, such as content owner name, asset type, model number, and one or more other configurable variables. In another example, the report may include details of the search history and the threshold that was exceeded, such as a quantity of searches that were performed within a specified period of time or the number of unique users that searched for the content. The report may also include a link that leads to more information about participating in the online marketplace. The report may also include potential price points of content and associated potential revenue.

Inclusion program 106 sends a notification (step 214). In an embodiment, inclusion program 106 sends a notification to the content owner whose content was not found in the search history to inform the content owner that queries for content associated with the content owner are being performed in the online marketplace. In an embodiment, the notification includes the report generated in step 212. An example of a notification is described in further detail with respect to FIG. 3. Inclusion program 106 may send the notification to the content owner using known methods, such as email or text message. In an embodiment, inclusion program 106 may generate a recorded audio message that inclusion program 106 pushes to a phone number associated with the content owner. In an embodiment where inclusion program 106 does not have contact information for the content owner, inclusion program 106 may send the notification to a marketplace administrator, such that the marketplace administrator can take action regarding notifying the content owner. In an embodiment, inclusion program 106 sends a notification to the content owner and sends a copy of the notification to a marketplace administrator for awareness.

Figure 3:
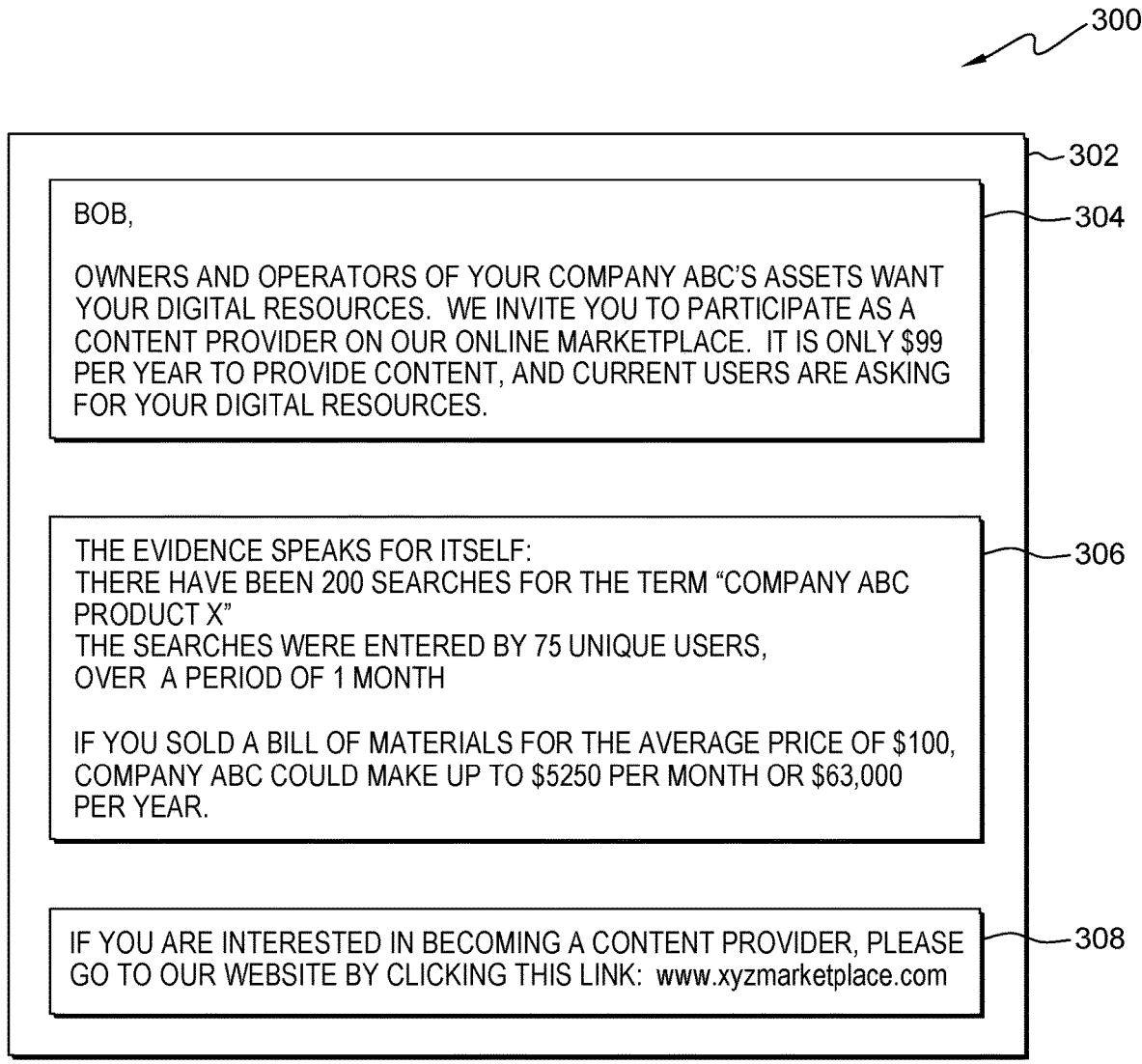
FIG. 3 illustrates an example of a notification provided by the inclusion program, on a client computing device within the distributed data processing environment of FIG. 1, in accordance with an embodiment of the present invention.

FIG. 3 illustrates example 300 of a notification provided by inclusion program 106, on client computing device 110 within distributed data processing environment 100 of FIG. 1, in accordance with an embodiment of the present invention.

Example 300 includes email 302 which is a notification to a contact in Company ABC regarding search queries performed by users of XYZ Marketplace. Email 302 includes opening 304, evidence 306, and closing 308.

Opening 304 informs the contact, Bob, that users are searching for digital resources associated with Company ABC's assets. Opening 304 also includes information regarding the price of subscribing to XYZ Marketplace as a content provider.

Evidence 306 includes a report of aggregated search data, as described with respect to steps 210 and 212 of FIG. 2. Evidence 306 also includes potential price points of content and associated potential monthly and annual revenue. Thus, the information in evidence 306 indicates the value of being a content provider in XYZ Marketplace.

Closing 308 includes a link to the website of XYZ Marketplace that can be clicked to lead Bob to more information on becoming a content provider to XYZ Marketplace.

Figure 4:
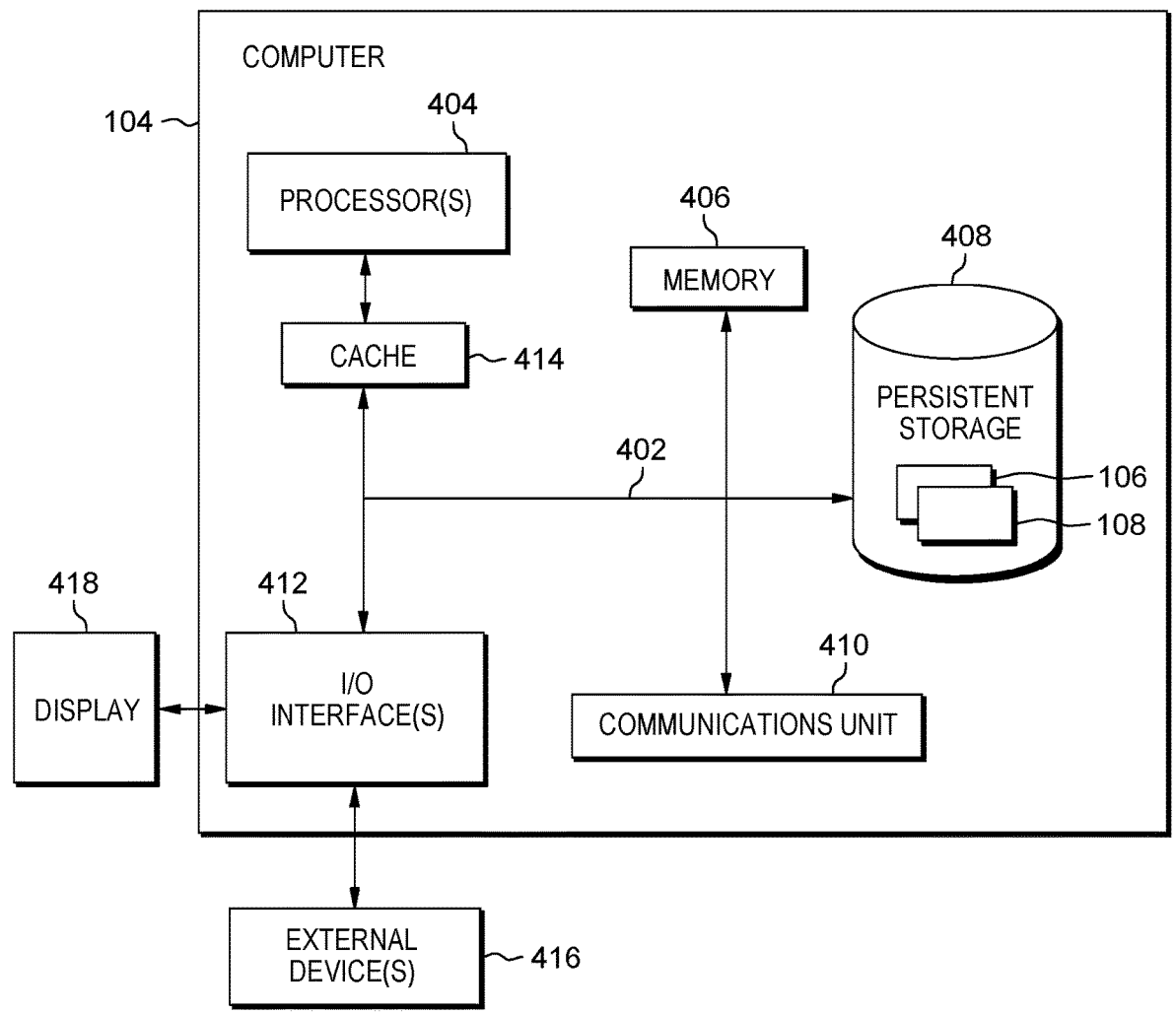
FIG. 4 depicts a block diagram of components of the server computer executing the intelligent mapping program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., inclusion program 106 and marketplace database 108, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 110. In these examples, communications unit 410 includes one or more network interface cards. Communications unit 410 may provide communications through the use of either or both physical and wireless communications links. Inclusion program 106, marketplace database 108, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., inclusion program 106 and marketplace database 108 on server computer 104, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    monitoring, by one or more computer processors, one or more queries for content in an online marketplace, wherein the one or more queries include one or more keywords, wherein the online marketplace is a digital twin marketplace, and wherein a digital twin is a digital representation of a physical asset;
    determining, by one or more computer processors, that a result of the one or more queries is content is not found;
    determining, by one or more computer processors, that a history of the result of the one or more queries for the content exceeds a threshold for content not found, wherein the threshold for content not found includes a specific quantity of unique users performing a query;

mapping, by one or more computer processors, the one or more queries to an owner of the content, wherein the one or more keywords include a model number associated with the content and wherein the mapping is based on an association of the model number with the owner of the content; and sending, by one or more computer processor, a notification of the history to the owner of the content.

2. The method of claim 1, further comprising:

aggregating, by one or more computer processors, information associated with the history; and based on the aggregated information, generating, by one or more computer processors, a report.

3. The method of claim 2, wherein the report includes a link that leads to information about participating in the online marketplace and evidence for convincing an owner of the content to participate in the online marketplace, and wherein the evidence indicates a value of being a content provider.

4. The method of claim 1, wherein the threshold for content not found includes a specific quantity of queries that do not result in desired content.

5. The method of claim 1, wherein determining that the result of the one or more queries is content is not found further comprises determining, by one or more computer processors, that the result was not selected.

6. A computer program product comprising:

one or more computer readable storage media and program instructions collectively stored on the one or more computer readable storage media, the stored program instructions comprising:

program instructions to monitor one or more queries for content in an online marketplace, wherein the one or more queries include one or more keywords, wherein the online marketplace is a digital twin marketplace, and wherein a digital twin is a digital representation of a physical asset;

program instructions to determine that a result of the one or more queries is content is not found;

program instructions to determine that a history of the result of the one or more queries for the content exceeds a threshold for content not found, wherein the threshold for content not found includes a specific quantity of unique users performing a query;

program instructions to map the one or more queries to an owner of the content, wherein the one or more keywords include a model number associated with the content and wherein the mapping is based on an association of the model number with the owner of the content; and program instructions to send a notification of the history to the owner of the content.

7. The computer program product of claim 6, the stored program instructions further comprising:

program instructions to aggregate information associated with the history; and based on the aggregated information, program instructions to generate a report.

8. The computer program product of claim 7, wherein the report includes a link that leads to information about participating in the online marketplace and evidence for convincing an owner of the content to participate in the online marketplace, and wherein the evidence indicates a value of being a content provider.

9. The computer program product of claim 6, wherein the threshold for content not found includes a specific quantity of queries that do not result in desired content.

10. The computer program product of claim 6, wherein the program instructions to determine that the result of the one or more queries is content is not found comprise program instructions to determine that the result was not selected.

11. A computer system comprising:

one or more computer processors;

one or more computer readable storage media;

program instructions collectively stored on the one or more computer readable storage media for execution by at least one of the one or more computer processors, the stored program instructions comprising:

program instructions to monitor one or more queries for content in an online marketplace, wherein the one or more queries include one or more keywords, wherein the online marketplace is a digital twin marketplace, and wherein a digital twin is a digital representation of a physical asset;

program instructions to determine that a result of the one or more queries is content is not found;

program instructions to determine that a history of the result of the one or more queries for the content exceeds a threshold for content not found, wherein the threshold for content not found includes a specific quantity of unique users performing a query;

program instructions to map the one or more queries to an owner of the content, wherein the one or more keywords include a model number associated with the content and wherein the mapping is based on an association of the model number with the owner of the content; and program instructions to send a notification of the history to the owner of the content.

12. The computer system of claim 11, the stored program instructions further comprising:

program instructions to aggregate information associated with the history; and based on the aggregated information, program instructions to generate a report.

13. The computer system of claim 12, wherein the report includes a link that leads to information about participating in the online marketplace and evidence for convincing an owner of the content to participate in the online marketplace, and wherein the evidence indicates a value of being a content provider.

14. The computer system of claim 11, wherein the threshold for content not found includes a specific quantity of queries that do not result in desired content.

* * * * *